(12) United States Patent
Tang et al.

(10) Patent No.: US 9,030,748 B2
(45) Date of Patent: May 12, 2015

(54) BRIGHTNESS ENHANCEMENT FILM, BACKLIGHT ASSEMBLY, AND DISPLAY APPARATUS

(71) Applicants:BOE Technology Group Co., Ltd., Beijing (CN); Beijing BOE Display Technology Co., Ltd., Beijing (CN)

(72) Inventors: Rong Tang, Beijing (CN); Xiang Li, Beijing (CN); Bin Zou, Beijing (CN); Dan Wang, Beijing (CN); Xibin Shao, Beijing (CN)

(73) Assignees: BOE Technology Group Co., Ltd., Beijing (CN); Beijing BOE Display Technology Co., Ltd., Beijing (CN)

( * ) Notice: Subject to any disclaimer, the term of this patent is extended or adjusted under 35 U.S.C. 154(b) by 0 days.

(21) Appl. No.: 14/102,248

(22) Filed: Dec. 10, 2013

(65) Prior Publication Data

US 2014/0168782 A1  Jun. 19, 2014

(30) Foreign Application Priority Data

Dec. 13, 2012  (CN) .......................... 2012 1 0539949

(51) Int. Cl.
*G02B 27/10*  (2006.01)
*G02B 3/00*  (2006.01)

(52) U.S. Cl.
CPC .................................. *G02B 3/0056* (2013.01)

(58) Field of Classification Search
CPC ... G02B 3/0056; G02B 3/005; G02B 27/2214
USPC .................................. 359/455, 463, 619–628
See application file for complete search history.

(56) References Cited

U.S. PATENT DOCUMENTS

2011/0051238 A1* 3/2011 Tamai ........................... 359/463
2014/0029638 A1* 1/2014 Welford et al. .............. 372/50.1

FOREIGN PATENT DOCUMENTS

CN          1906503 A       1/2009
CN        101520522 A       9/2009
CN        201788296 U       4/2011

OTHER PUBLICATIONS

English translation of first Office Action dated Apr. 15, 2014, for the corresponding Chinese Patent Application No. 201210539949.X.
English translation of second Office Action dated Dec. 3, 2014, for corresponding Chinese Patent Application No. 201210539949.X.

* cited by examiner

*Primary Examiner* — Mahidere Sahle
(74) *Attorney, Agent, or Firm* — Kinney & Lange, P.A.

(57) ABSTRACT

A brightness enhancement film includes a substrate; and a microlens structure formed on the substrate, wherein the microlens structure comprises a plurality of microlenses, each of the microlenses comprising a bottom surface contacting with the substrate, the bottom surface of each of the plurality of microlenses being of a polygonal shape such that at the substrate each of the plurality of microlenses is in close contact with adjacent microlenses surrounding it, without gaps leaving between them. The present invention also discloses a backlight module and a display apparatus comprising the above brightness enhancement film. The brightness enhancement film can improve optical gain property, reduce the thickness of the display apparatus and expand the view angle.

9 Claims, 3 Drawing Sheets

BRIGHTNESS ENHANCEMENT FILM, BACKLIGHT ASSEMBLY, AND DISPLAY APPARATUS

CROSS-REFERENCE TO RELATED APPLICATION

This application claims the benefit of Chinese Patent Application No. 201210539949.X filed on Dec. 13, 2012 in the State Intellectual Property Office of China, the whole disclosure of which is incorporated herein by reference.

BACKGROUND OF THE INVENTION

1. Field of the Invention

The present invention relates to the field of display technology, and more particularly, to a brightness enhancement film, a backlight module and a display apparatus.

2. Description of the Related Art

In a flat panel display, a LCD panel is a device which itself does not emit light. Instead, it uses a backlight unit to emit light. The backlight unit comprises: a support frame for fixing purpose; a reflecting sheet mounted on the bottom surface of the support frame for reflecting light toward the LCD panel; a light guidance plate provided on the reflecting sheet for guiding light; a dissipation sheet provided on the light guidance plate for homogenizing light; a light source provided between the light guidance plate and a side wall of a receiving space of the support frame or disposed below the dissipation sheet for generating light; a prismatic lens provided on the dissipation sheet for concentrating light; a protection film for protecting the dissipation sheet and the prismatic lens; and other optical films or the like.

The microstructure of the prismatic lens used in the backlight source for a LCD panel has a triangle cross section. Typically, a prismatic lens is provided in a longitudinal direction and another prismatic lens is provided in a transversal direction to realize light concentration both in a horizontal direction and in a vertical direction. However, since two prismatic lenses are used, the thickness of the backlight unit and the number of used components are increased. On the other hand, because the microstructure of the prismatic lens has a triangle cross section, the visual angle is relatively narrow.

Instead of the above prismatic lenses, it is proposed a microlens structure for a brightness enhancement film, which, compared with the above prismatic lenses, has a better visual angle effect, but has a relatively poor optical gain effect. FIG. 7 shows a schematic view of a bottom surface structure of the microlens structure for a brightness enhancement film in contact with a substrate in the prior art. As shown in FIG. 7, the microlens structure for the brightness enhancement film is made up of circular microlenses 30. For such circular microlenses 30 in the prior art, light, when passing through spaces 40 between the respective circular microlenses 30, is not concentrated, thus the light focusing effect is abated.

SUMMARY OF THE INVENTION

The present invention has been made to overcome or alleviate at least one aspect of the above mentioned disadvantages.

Accordingly, it is an object of the present invention to provide a brightness enhancement film, a backlight module and a display apparatus, which can improve optical gain property.

According to an aspect of the present invention, there is provided an brightness enhancement film, comprising a substrate and a microlens structure formed on the substrate, wherein the microlens structure comprises a plurality of microlenses, each of the microlenses comprising a bottom surface contacting with the substrate, the bottom surface being of a polygonal shape such that at the substrate each of the plurality of microlenses is in close contact with adjacent microlenses surrounding it, without gaps leaving between them.

Another aspect of the present invention provides a backlight module comprising the above brightness enhancement film.

A further aspect of the present invention provides a display apparatus comprising the above backlight module.

BRIEF DESCRIPTION OF THE DRAWINGS

The above and other features of the present invention will become more apparent by describing in detail exemplary embodiments thereof with reference to the accompanying drawings, in which.

DETAILED DESCRIPTION OF PREFERRED EMBODIMENTS OF THE INVENTION

Figure 1:
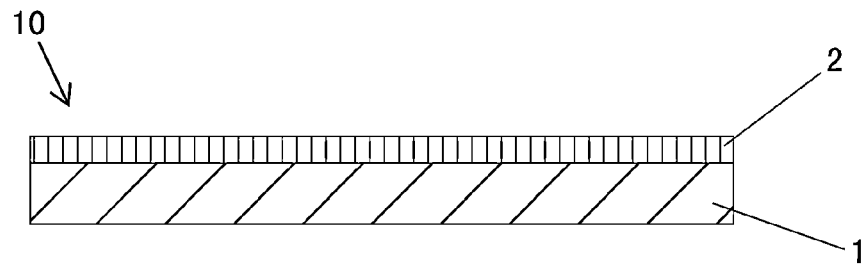
FIG. 1 is a schematic structural view of a brightness enhancement film according to a first embodiment of the present invention.

Exemplary embodiments of the present disclosure will be described hereinafter in detail with reference to the attached drawings, wherein the like reference numerals refer to the like elements. The present disclosure may, however, be embodied in many different forms and should not be construed as being limited to the embodiment set forth herein; rather, these embodiments are provided so that the present disclosure will be thorough and complete, and will fully convey the concept of the disclosure to those skilled in the art.

Embodiment 1

Figure 2:
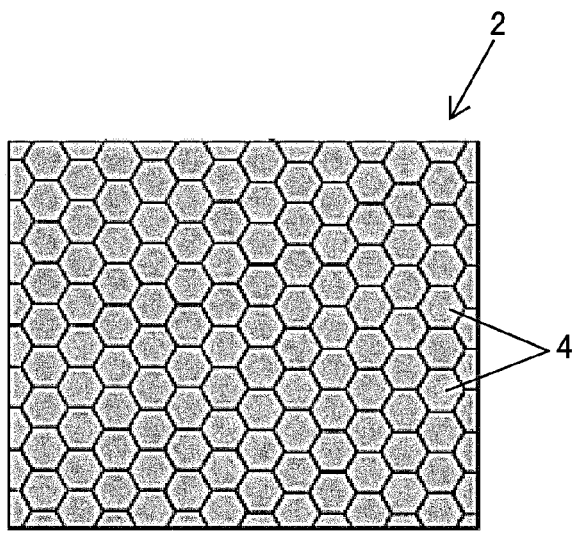
FIG. 2 is a schematic structural view of a bottom surface of a microlens structure for the brightness enhancement film in FIG. 1, wherein the bottom surface is in contact with the substrate.
Figure 3:
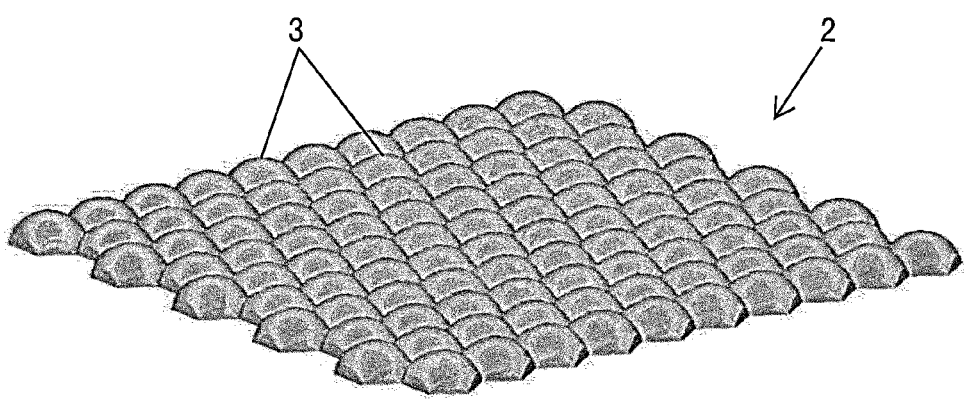
FIG. 3 is a perspective view of the microlens structure as shown in FIG. 2.
Figure 4:
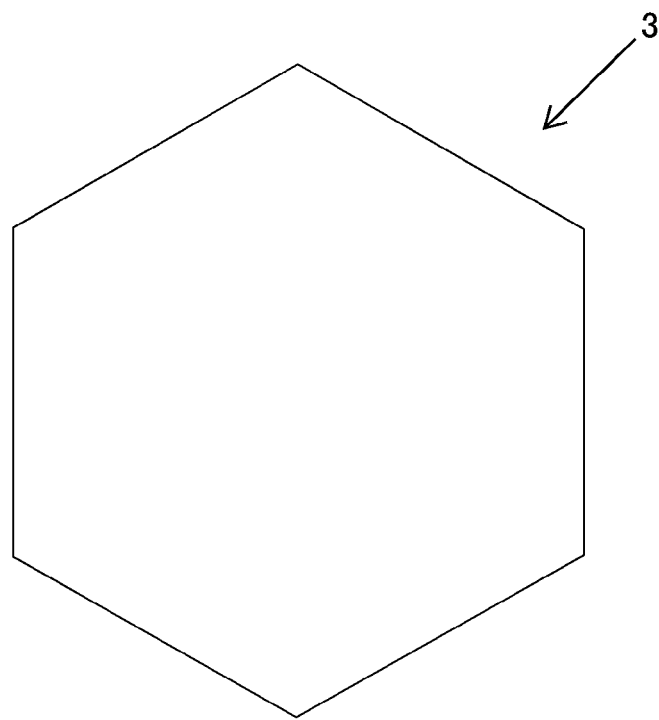
FIG. 4 is a front view of a single microlens of the microlens structure as shown in FIG. 3.
Figure 5:
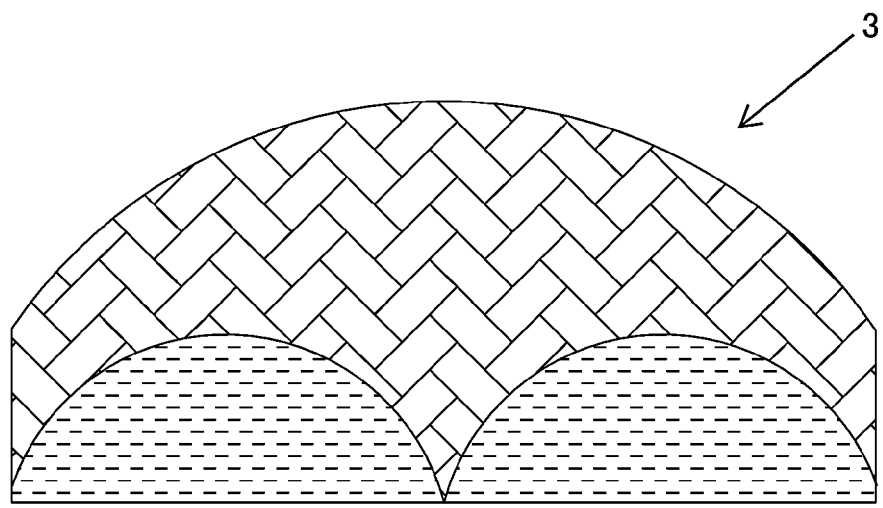
FIG. 5 is a bottom view of the single microlens as shown in FIG. 4.
Figure 6:
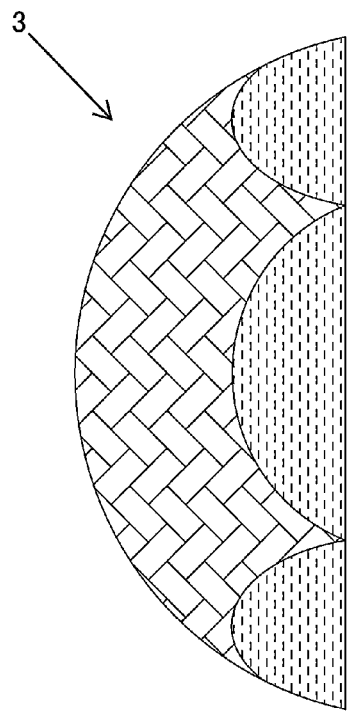
FIG. 6 is a left view of the single microlens as shown in FIG. 4.

As shown in FIG. 1 with reference to FIGS. 2 and 3, a brightness enhancement film 10 according to a first embodiment of the present invention comprises a substrate 1 and a microlens structure 2 formed on the substrate. The microlens structure 2 comprises a plurality of microlenses 3. Each of the microlenses 3 comprises a bottom surface 4 in contact with the substrate 1. The bottom surface 4 of each of the microlenses 3 is of a polygonal shape such that at the substrate 1, each of the plurality of microlenses 3 is in close contact with adjacent microlenses surrounding it, without gaps leaving between them.

According to this embodiment of the present invention, the microlens is a structural body formed by a prism with its top portion being intersected by a convex spherical surface.

For example, FIGS. 3-6 show a microlens structure 2 composed of a plurality of microlenses 3. Each of the microlenses 3 is formed by intersecting a top portion of a regular hexagonal prism with a spherical surface such that the top of the microlens is substantially in a spherical cap shape. That is, the microlens 3 is a structural body formed by a hexagonal prism with its top portion being intersected by a spherical surface. The bottom surface 4 of each microlens is in contact with the substrate 1, and the bottom surface 4 is of a regular hexagonal shape. Each of the microlenses 3 is of the same size and is a convex lens.

The substrate 1 is made of for example PET (polyethylene terephthalate), PC (polycarbonate), PS (polystyrene) or other transparent resin material, preferably of PET. The microlens 3 is made of organic glass (PMMA (polymethyl methacrylate)) or other transparent resin material. The substrate 1 and the microlens structure 2 can be made of the same or different materials.

Embodiment 2

The brightness enhancement film according to a second embodiment of the present invention is substantially the same as that of the first embodiment. The brightness enhancement film according to the second embodiment also comprises a substrate 1 and a microlens structure 2 formed on the substrate. The microlens structure 2 comprises a plurality of microlenses. Each of the microlenses comprises a bottom surface in contact with the substrate. The bottom surface of each of the microlenses is of a polygonal shape such that at the substrate, each of the plurality of microlenses is in close contact with adjacent microlenses surrounding it, without gaps leaving between them.

The substrate may be made of for example PET (polyethylene terephthalate), PC (polycarbonate), PS (polystyrene) or other transparent resin material, preferably of PET. The microlens is made of organic glass (PMMA (polymethyl methacrylate)) or other transparent resin material. The substrate and the microlens structure can be made of the same or different materials.

The microlenses in the second embodiment differs from the first embodiment in that: the bottom surface of each of the microlenses which in contact with the substrate is of a regular triangular shape and each of the microlenses is a concave lens. For example, the concave lens can be obtained by intersecting the top portion of a triangular prism with a concave spherical surface.

Embodiment 3

The brightness enhancement film according to a third embodiment of the present invention is substantially the same as that of the first embodiment and the second embodiment. The brightness enhancement film according to the third embodiment also comprises a substrate and a microlens structure formed on the substrate. The microlens structure comprises a plurality of microlenses. Each of the microlenses comprises a bottom surface in contact with the substrate. The bottom surface of each of the microlenses is of a polygonal shape such that at the substrate, each of the plurality of microlenses is in close contact with adjacent microlenses surrounding it, without gaps leaving between them.

The substrate may be made of for example PET (polyethylene terephthalate), PC (polycarbonate), PS (polystyrene) or other transparent resin material, preferably of PET. The microlens is made of organic glass (PMMA (polymethyl methacrylate)) or other transparent resin material. The substrate and the microlens structure can be made of the same or different materials.

The microlenses in the third embodiment differs from those in the first embodiment or the second embodiment in that: the bottom surface of each of the microlenses which contacts with the substrate is of a square shape and each of the microlenses is a convex lens. For example, the convex lens can be obtained by intersecting the top portion of a quadrangular prism with a convex spherical surface.

OTHER EMBODIMENTS

Although the first to third embodiments have shown several examples in which the bottom surface of the microlens is of a specific regular polygonal shape, it should be appreciated that the bottom surface of the microlens may be of other shapes including other regular polygonal shapes, and even including non-regular polygonal shapes, as long as the respective microlenses composing the microlens structure are in close contact with one another at the substrate without leaving gaps between them.

Another aspect of the present invention provides a backlight module comprising the brightness enhancement film according to the above embodiment(s) of the present invention.

A further aspect of the present invention provides a display apparatus comprising the above backlight module. The display apparatus may be a LCD panel, a LCD display, a LCD TV or a E-paper, or other display apparatus.

With the brightness enhancement film, the backlight module and the display apparatus according to the present invention, the optical gain property can be improved, the total thickness of the display apparatus can be reduced and the viewing angle scope of the display apparatus is larger than that of a prism lens with a triangular cross section.

The different effect of the brightness enhancement film according to the present invention and the brightness enhancement film in the prior art will be explained by way of example.

Figure 7:
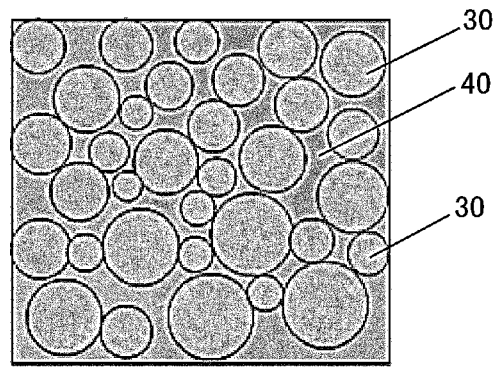
FIG. 7 is a schematic structural view of a bottom surface of a microlens structure for a brightness enhancement film in the prior art, wherein the bottom surface of the microlens structure is in contact with a substrate.

The brightness enhancement film in the art is made of circular microlenses as shown for example in FIG. 7. Light, when passing through the spaces between the circular microlenses, will not be concentrated and thus the light focusing effect is abated.

Figure 8:
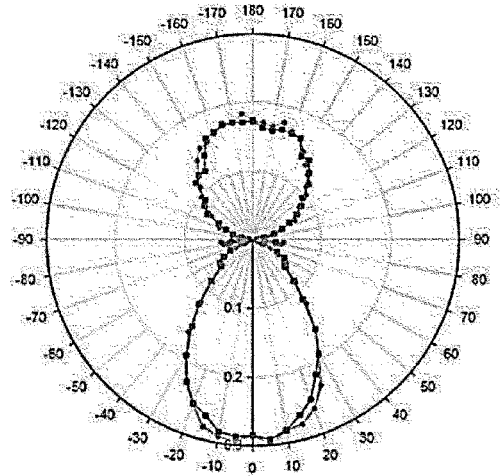
FIG. 8 is a simulation diagram showing the light intensity of the microlens structure for the brightness enhancement film in the prior art.
Figure 9:
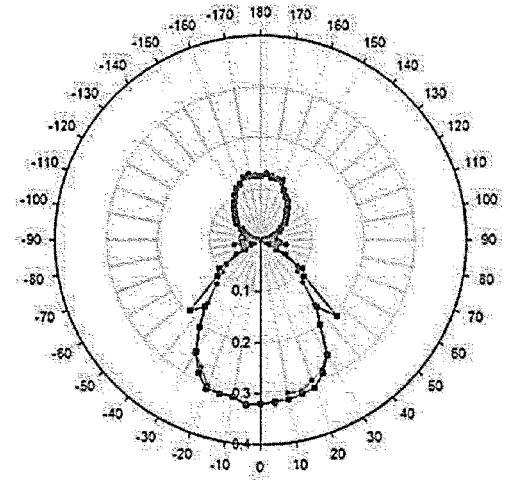
FIG. 9 is a simulation diagram showing the light intensity of the microlens structure for the brightness enhancement film of the present invention.

Referring to FIG. 8 and FIG. 9, FIG. 8 is an optical intensity simulation diagram of the microlens structure shown in FIG. 7, and FIG. 9 is an optical intensity simulation diagram of the microlens structure according to the present invention. The test is conducted by passing the light from the same light source through the microlens structure as shown in FIG. 7 and the microlens structure 2 according to the present invention, and setting a receiver after the microlens structure to check the value of the optical intensity, respectively. The larger the optical intensity is, the larger the light concentrating effect of the microlens structure is. The result of the simulation shows that the light concentrating effect of the present invention is better than that of the microlens structure in the prior art.

Therefore, the microlens structure of the present invention can increase light concentrating effect and improve the utilization rate of the light.

Although several exemplary embodiments have been shown and described, it would be appreciated by those skilled in the art that various changes or modifications may be made in these embodiments without departing from the principles and spirit of the disclosure, the scope of which is defined in the claims and their equivalents.

What is claimed is:

1. A brightness enhancement film, comprising:
   a substrate; and
   a microlens structure formed on the substrate,
   wherein the microlens structure comprises a plurality of microlenses, each of the microlenses comprising a bottom surface contacting with the substrate, the bottom surface of each of the plurality of microlenses being of a polygonal shape such that at the substrate each of the plurality of microlenses is in close contact with adjacent microlenses surrounding it, without gaps leaving between them; and
   wherein each microlens is a structural body formed by intersecting a top portion of a prism by a spherical surface.

2. The brightness enhancement film according to claim 1, wherein the polygonal shape comprises a regular polygonal shape.

3. The brightness enhancement film according to claim 2, wherein the regular polygonal shape comprises a regular hexagon, a regular triangle or a square.

4. The brightness enhancement film according to claim 1, wherein each microlens is a convex lens.

5. The brightness enhancement film according to claim 1, wherein each microlens is a concave lens.

6. The brightness enhancement film according to claim 1, wherein the substrate and the microlenses are made of transparent resin material.

7. The brightness enhancement film according to claim 1, wherein the microlenses have the same size.

8. A backlight module, comprising the brightness enhancement film according to claim 1.

9. A display apparatus, comprising the backlight module according to claim 8.

* * * * *